United States Patent Office 2,841,565
Patented July 1, 1958

2,841,565

**METHOD OF MAKING THERMOSETTING MOLD-
ING COMPOSITIONS CONTAINING FILLER**

Leopold F. Bornstein, Wilmington, Del.

No Drawing. Application June 15, 1956
Serial No. 591,536

14 Claims. (Cl. 260—17.3)

This invention relates to the manufacture of thermosetting molding compositions containing a urea-, thiourea-, or melamine-formaldehyde resin or a similar resin having thermosetting properties in association with various fillers known in the art. The filler may consist of a fibrous material such as woodflour, sulfite pulp, alpha-cellulose, asbestos, or glass fibers or a mineral filler.

This application is a continuation-in-part application of my copending application, Serial No. 343,249, filed March 18, 1953, now abandoned.

Heretofore in the preparation of urea-formaldehyde and similar molding compositions it has been customary to prepare a resin syrup constituting the product of the partial condensation of the urea and formaldehyde and then admix therewith, either in the reaction kettle or in any other suitable apparatus such as a kneader, a suitable proportion of filler. The proportion of filler may vary over a wide range, but usually constitutes from 25–50% by weight of the total composition determined on a dry basis.

The impregnated filler is dried at a carefully controlled temperature so that the water content of the resin syrup, as well as any additional condensation water formed during the drying, may escape without, however, advancing or curing the resin to the point where it will adversely affect the flow and hardening properties of the composition when later subjected to hot molding. The drying operation is a slow operation and a very critical one, and usually is carried out in a continuous type drying oven or in a shelf dryer of the atmospheric or vacuum type.

The dry material in lump form is then ground, usually in a ball mill, to a very fine powder, e. g., to about 300 mesh. The ball mill must be specially lined to prevent contamination and provided with a cooling jacket so as to keep the temperature of the material below the point where the curing reactions will be advanced. The ball milling operation is a time-consuming operation but has been necessary in order to insure uniform distribution of the curing catalyst, lubricant and any dyes or pigments customarily incorporated at this stage.

The resulting powder is suitable for molding as it is and represents one commercial grade of molding composition. However, at the present time only a relatively small proportion of thermosetting molding compositions of the urea-formaldehyde types are sold in this form, due to their excessively high bulk which makes it difficult to mold the material especially when molding objects requiring a deep draw. This fine powder also has a tendency to burn in the mold and give rise to discolored spots. For most applications the fine powder undergoes an additional densifying operation.

The densifying operation takes either of two types. It is a recent practice, especially with molders, to densify the powder by pre-forming it in a suitable tableting machine. However, the excessively high bulk of the powder makes it difficult to pre-form or tablet. Moreover, when the tableting is done by the molder there are increased shipping costs due to the bulkiness of the powder.

The other method of densifying consists in putting the fine powder into a Banbury mixer or a mixer of similar type where it is mixed and kneaded under controlled heating conditions to bring about fusion of the powdered material and its conversion into lumps. This operation has to be very carefully controlled, because if the time is too long or the temperature is too high the material tends to cure in the presence of the curing catalyst, which is customarily added at the ball milling stage, and loses its ability to flow when later subjected to hot molding.

The fused or compressed material obtained by either of the densifying methods mentioned above, is then granulated, usually by means of special granulating apparatus to produce a material with a low bulking factor suitable for satisfactory and rapid molding. The granulated material obtained from a densified product produced by the mixing and fusion method contains much less fines and has a much more satisfactory bulking factor than the product obtained by merely compressing into tablets since the latter type of product shows a tendency to break up into powder again.

It will be understood that the many operations that have been heretofore required to produce a satisfactory densified and granular product add very considerably to the cost of the product. It has been the endeavor of workers in the art for a long time to simplify the process and eliminate some of these operations. However, so far as I am aware, prior attempts to reduce the number of steps have not been successful and have resulted in a product having many basic shortcomings in one respect or another.

The improved process of the present invention eliminates many of the complexities of the prior practice and yields a product having good commercial value. This process has the advantages of simplicity of operation, reduces the investment in equipment and the cost of processing as respects labor, time and required power, and insures close control of the product.

According to my process the initial resin-forming reaction is carried on in the presence of the filler and, if desired, other compounding ingredients, and brings about the simultaneous impregnation of the filler. The urea-, thiourea-, or melamine-formaldehyde or paraformaldehyde ingredients are introduced preferably in the dry form along with the filler into a jacketed mixer or kneader or any type where the mixture is confined within a space. Preferably a ribbon type mixer is employed. A machine of light construction is suitable since the material is at all times free-flowing and easy to handle. The mixer is closed merely with a lid and exerts no pressure on the mixture other than the weight of the lid. The material is heated with mixing until the temperature has been brought to the point where the condensation reaction will take place. As soon as condensation begins the mixture becomes wet and the water liberated helps to wet and impregnate the filler. The mixing is continued until most of the water of condensation has been liberated and the condensation has been highly advanced. At this stage the reaction is arrested by quickly bringing the temperature down by cooling. When the temperature has been brought down to a sufficient degree, the curing catalyst is added to the mixture and the cooling continued with further mixing for an additional short period of time.

It is essential and important that the initial reaction be in a confined or closed area where the escape of water vapors will be limited but it is not necesary to operate in an air-tight container or under pressure such as an autoclave. I have found that a confined space closed by a lid and its resultant weight is sufficient. The confinement of the water vapors is necessary to insure impregnation of the filler with the reacted product. If complete escape of the water vapors is permitted, the impregnation will not occur. At the same time, it is not necessary to operate in an air-tight confinement which would create high pressures due to the heat and formation of water and formaldehyde vapors. It will be appreciated that an ordinary closed container and the bulk of the reaction mass will serve to restrain and limit escape of the formed water vapor. Furthermore, the confinement of the reaction mixture in this manner allows the mixture to reach the condensation temperature with low pressure steam. On the other hand, if the reaction mixture were in a completely open vessel, it would require super-heated or high pressure steam to reach the necessary temperature of 200 to 230° F.

The cooling of the reaction mixture and addition of the catalyst can be done either in the same mixer or the material can be transferred to another mixer of the same type for the cooling stage. Since the initial mixing is done in a confined vessel so that escape of liberated water is limited and the temperature within the mixing chamber will usually be above the boiling point of water during the reaction period, cooling and simultaneous removal of the water in the form of vapors will be facilitated by opening the mixer or transferring the charge to a second mixer open to the atmosphere and also preferably provided with a cooling jacket. Usually the water present will be only that amount liberated in the condensation reaction. However, a controlled small amount of water may be added at the beginning of the operation, care being taken to keep the proportion of added water below the point where the product as it is discharged from the cooling mixer, or at the end of the cooling step when conducted in the initial reaction mixer is noticeably wet or lumpy. Because the amount of water present is limited, the superheat contained in the water, in the form of steam, and in the reaction mixture will usually be sufficient to cause substantially all of the water to pass off as vapors upon opening the mixer to the atmosphere with an accompanying cooling action on the remaining mixture.

The reacted material, containing the curing catalyst and any other additions that have heretofore been made at the ball milling stage, such as a lubricant, dyes or pigments, and sometimes a plasticizer, is then transferred to a heated mixing or kneading apparatus suitable for further advancing and densifying the material and there subjected to continued mixing or kneading under conditions permitting of the free escape of any remaining traces of water and, at the same time, densified into lumps. This operation is a short one and yields a finished molding compound which has only to be granulated or pulverized in a grinding operation.

The temperature at which the densifying operation is carried out should be sufficiently high so that the reacted material fuses together and gives off the remaining water but insufficient to bring about substantial concomitant advancement of the material in the relatively short period of treatment in the densifier. The optimum temperature is that which promotes the fusing and drying of the reacted material within a period of time of from 2 to 4 minutes. Usually operation of the densifier at a temperature corresponding to a steam pressure of 60-80 lbs. in the jacket of the densifier will be found satisfactory.

The following examples further illustrate the practice of this invention:

*Example 1*

| | Lbs. |
|---|---|
| Alpha-cellulose | 50 |
| Urea | 79 |
| Paraformaldehyde | 60 |
| Ammonia | 0.65 |
| Hexamine | 3 |
| Zinc stearate | 0.25 |

Pigments and dyes, depending on desired color.

*Example 2*

| | Lbs. |
|---|---|
| Alpha-cellulose | 50 |
| Melamine | 80 |
| Paraformaldehyde | 60 |
| Ammonia | 0.65 |
| Hexamine | 3 |
| Zinc stearate | 0.25 |
| Water | 10 |

Pigments and dyes, depending on desired color.

*Example 3*

| | |
|---|---|
| Woodflour | 75 |
| Thiourea | 80 |
| Paraformaldehyde | 50 |
| 37% Liquid formaldehyde | 25 |
| Ammonia | 0.65 |
| Hexamine | 3 |
| Zinc stearate | 0.25 |

Pigments and dyes, depending on desired color.

The material of each of the above examples was treated in the same manner. It was placed in the mixer which was then closed with a lid and heated to bring the temperature of the mix to about 200-230° F. When the temperature rises above 200° F., it can be noticed immediately that the mixture gets wet from the condensation water resulting from the reaction between the paraformaldehyde or formaldehyde and the urea, melamine or thiourea with resultant formation of the resin. This condensation water helps to wet and impregnate the filler, and some pressure may be developed in the mixer which further aids in the impregnation. The contents of the mixer reduce in bulk. When the reaction temperature is reached, the reaction is continued for an additional period of time—usually 5-10 minutes, depending on conditions—and the mixer is then opened to enable the condensation water to escape as vapors. The heating is continued with the agitator running. The vapors escape very fast, and the resulting free flowing particles of impregnated fiber feel only very slightly moist. An indication that the condensation reaction is completed is the lack of substantial formaldehyde odor. This drying usually takes about 5-15 minutes depending on conditions. Following opening of the lid, the temperature usually drops to about 180° F.

At this stage, an additional 2 lbs. of hexamine is added, and 1% by weight of epichlorohydrin or another suitable latent curing catalyst figured on the dry weight of the mixture is added. The bottom valve is opened and the material is transferred to another identical mixer for cooling. This mixer is agitated and water is circulated through the jacket. The material remains in this mixer until the catalyst and the hexamine have been intimately admixed with the resin-impregnated filler.

During the interval when the mixture is being worked in the second mixer, the first mixer is ready to accept another charge and may be put in operation to produce a second batch of the resin-impregnated filler material. Upon completion of the mixing operation in the cooling mixer, the resulting mixture is then charged into a heated densifier which may, for example, be of the type currently manufactured by Beardsley & Piper, Inc., for compounding plastic materials. In this apparatus the material undergoes a very thorough mixing under the action of mulling wheels or discs and is densified into small lumps. At the same time, any remaining water and volatiles are sucked out by means of a suction fan mounted on the top of the machine. This densifying treatment is very short and usually is completed in from 2 to 4 minutes. The material is then discharged onto a moving conveyor belt.

The conveyor brings the material to a small crusher, preferably of the cutter type, where the material is then cut into small pieces. This operation is an important feature of the invention in that it provides a rapid cooling and dissipation of heat acquired by the material under the working of the mulling wheels in the densifier and prevents any further advancement or curing of the molding material. On passing through this small cutter the material is then conveyed to a larger cutter where the final granulation takes place.

The speed of the conveyor and the length of the conveyor belt should be such as to allow the material to cool sufficiently before it is fed to the larger cutter for the final grinding step. Although the material can be handled well if it has been cooled down only to about 100–120° F., it is preferable to cool it to room temperature or below. The material leaving the larger cutter is in a finished state and can be sold as is or blended into larger batches in any suitable blender of a ribbon or conical type.

The finished material possesses all the desirable properties of the best grade conventional molding material. To be more specific, the urea-formaldehyde resin made from Example 1 has the following physical characteristics:

| | |
|---|---|
| Specific gravity | 1.5. |
| Bulk factor | About 2.5. |
| Water absorption | Less than .5%. |
| Compressive strength, lbs./sq in | 35,000. |
| Tensile strength, lbs./sq. in | 5,500. |
| Dielectric strength, short time—v./mill | 350. |
| Arc resistance | 110. |
| Impact strength, Izod, ft. lbs./in | .24 |
| Molding properties | Excellent. |
| Preforming properties | Excellent. |
| Translucency | Excellent. |
| Boiling water resistance (after 20 min. boiling) | Excellent. |

Various modifications in the procedure as well as various substitutions or changes in the proportions of the ingredients of the composition may be made without departing from the invention. For example, the ratio of the filler to the amino component and/or aldehyde may be varied over a wide range depending on the desired translucency and strength characteristics. Any suitable filler, such as walnut-shell flour, sulfite pulp, glass fiber, asbestos, other mineral fillers, keratin, cellophane and similar materials may be used in place of alpha-cellulose or woodflour. Likewise, similar amino compounds such as biuret may replace urea, melamine or thiourea or mixtures of these may be used. Any buffering alkali, such as triethanol amine, can be used in place of ammonia as long as the alkaline conditions are equal. I prefer to use ammonia because of its reactivity with formaldehyde and the effect of the formed hexamine on the final curing speed.

I prefer to add hexamine in two steps. It is added in the first step to establish an alkaline condition favorable to the promotion of the condensation reactions. Addition of hexamine in the second stage tends to speed up the final curing of the molding compound in the subsequent hot molding operation. The hexamine added in the second stage partially decomposes during the densifying operation and during the subsequent molding operation to release additional formaldehyde which speeds up the molding or curing operation. The amount of hexamine introduced in the second stage may be either increased or decreased depending on the curing speed required.

When using a high proportion of filler or a relatively high proportion of pigments, it is sometimes advantageous to introduce a small amount of water—say up to 2½ to 10% but preferably less than 5% by weight of the total dry weight of the ingredients of the reaction mixture—to improve the impregnation of the filler and dispersion of the pigments and other additions more uniformly throughout the mixture.

Although the invention may be practiced with use of a wide range of curing catalysts, and especially those known as latent catalysts, I prefer to use epichlorohydrin because it has a number of advantages not possessed by any single catalyst heretofore used so far as I am aware. In the first place, it is a liquid and, therefore, easy to disperse. It is very inactive at low temperatures and, therefore, can be added even at an early stage of the mixing without curing the resin. It has been established that the mix can even be left for 24 hours at 140° F. without any changes in its character and even without any effect on further processing. Finally, this catalyst has a very rapid curing action at conventional molding temperatures. The use of the epichlorohydrin as a latent catalyst in molding compositions is the subject of my copending application Serial No. 334,730, filed February 2, 1953, now Patent No. 2,810,700. Although it is advantageous to add the curing catalyst to the mixer either immediately after the condensation reaction has been arrested and substantially all of the water has been driven off or to the second mixer at the beginning or during the mixing operation therein, it is also possible to add the catalyst at any later stage in the second mixer or in the densifier up to a minute or two before the material is ready to be discharged from the densifier. When the catalyst used is more reactive than epichlorohydrin under the conditions obtaining either in the mixer or the densifier, it will be desirable to postpone its addition to the mixture until near the end of the densifying operation in the densifier.

Although I prefer to conduct the densifying operation with the use of a densifier of the Beardsley & Piper type because this machine has a very efficient mixing and densifying action and gives a very carefully controlled and uniform batch, other machines with a similar densifying action, such as a Banbury mixer or even compounding rolls such as used by the plastics and rubber industry can be used with no or very slight modification in the procedure.

The product as it is discharged from the larger cutter is in the desired granulated form for molding, thus making it unnecessary to resort to any ball milling or micro pulverizing operation. However, if for any reason the powdered form is desirable, the granulated material can be pulverized in a micro pulverizer or even ball milled to a fine powder. For example, for some purposes it may be desirable to make the material in colorless form and add the color later. In such case a colorless material can be prepared by reacting, mixing and densifying as above described. The colorless product can be pulverized and blended with dyes or pigments, or even a curing catalyst, in the ball mill or micro pulverizer. If a final granulated material is desired, the powder can then be redensified in the Beardsley & Piper or another suitable densifier or compressed in a tabletting machine and finally regranulated.

I claim:

1. The improvement in the manufacture of thermosetting molding compositions which comprises reacting in a confined zone an aldehyde selected from the group consisting of formaldehyde, paraformaldehyde and mixtures thereof with an amino compound selected from the group consisting of urea, thiourea, melamine and mixtures thereof at a temperature within the range 200–230° F. in the presence of a fibrous filler component and less than 10% water based on the dry weight of said molding composition while limiting the escape from the confined zone of water previously present and that liberated in the condensation reaction, and upon substantial completion of the condensation reaction quickly cooling the reaction mixture and simultaneously releasing the water vapor from the confined zone.

2. A process according to claim 1 wherein said condensation reaction mixture is quickly cooled to a temperature of about 180° F.

3. A process according to claim 1 wherein the initial reaction mixture contains a controlled minor proportion of water insufficient to leave the reacted mixture in a wet state at the conclusion of the cooling step which follows the condensation reaction step.

4. A process according to claim 1 wherein said aldehyde is paraformaldehyde, said amino compound is urea and said filler is alpha-cellulose.

5. A process according to claim 1 wherein said filler is alpha-cellulose.

6. A process according to claim 1 wherein said aldehyde is paraformaldehyde, said amino compound is melamine and said filler is alpha-cellulose.

7. A process according to claim 1 wherein said amino compound is thiourea and said filler is alpha-cellulose.

8. A process according to claim 1 wherein said filler is wood flour.

9. A process according to claim 4 wherein said paraformaldehyde, urea and alpha-cellulose are substantially dry prior to said reaction in said confined zone.

10. The improvement in the manufacture of thermosetting molding compositions which comprises reacting in a confined zone an aldehyde selected from the group consisting of formaldehyde, paraformaldehyde, and mixtures thereof with an amino compound selected from the group consisting of urea, thiourea, melamine and mixtures thereof at a temperature within the range 200–230° F. in the presence of a fibrous filler component and less than 10% water based on the dry weight of said molding composition while limiting the escape from the confined zone of water previously present and that liberated in the condensation reaction, and upon substantial completion of the condensation reaction quickly cooling the reaction mixture and simultaneously releasing the water vapor from the confined zone, then adding a latent curing catalyst to said reaction mixture, then densifying said reaction mixture by heating at a sufficient temperature to fuse but insufficient to substantially advance curing of said reaction mixture, and then rapidly cooling the densified material.

11. A process according to claim 10 wherein said aldehyde is paraformaldehyde, said amino compound is urea and said filler is alpha-cellulose.

12. A process according to claim 10 wherein said aldehyde is paraformaldehyde, said amino compound is melamine and said filler is alpha-cellulose.

13. A process according to claim 10 wherein said amino compound is thiourea and said filler is alpha-cellulose.

14. The improvement in the manufacture of thermosetting molding compositions which comprises reacting in a confined zone under alkaline conditions paraformaldehyde with an amino compound selected from the group consisting of urea, thiourea, melamine and mixtures thereof at a temperature range between the point where condensation between said paraformaldehyde and amino compound occurs and 230° F. in the presence of an alpha-cellulose filler and less than 10% water based on the dry weight of said molding composition while limiting the escape from the confined zone of water previously present and that liberated in the condensation reaction, and upon substantial completion of the condensation reaction quickly cooling the reaction mixture and simultaneously releasing the water vapor from the confined zone.

References Cited in the file of this patent

FOREIGN PATENTS 328,938     Great Britain _____ May 2, 1930